US011599050B2

(12) United States Patent
Miki et al.

(10) Patent No.: US 11,599,050 B2
(45) Date of Patent: Mar. 7, 2023

(54) IMAGE FORMING APPARATUS AND NON-TRANSITORY COMPUTER READABLE MEDIUM STORING PROGRAM

(71) Applicant: FUJIFILM Business Innovation Corp., Tokyo (JP)

(72) Inventors: Masayoshi Miki, Kanagawa (JP); Teiju Sato, Kanagawa (JP); Masato Saito, Kanagawa (JP); Yasuhiro Nakatani, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 335 days.

(21) Appl. No.: 16/872,388

(22) Filed: May 12, 2020

(65) Prior Publication Data

US 2021/0116850 A1 Apr. 22, 2021

(30) Foreign Application Priority Data

Oct. 16, 2019 (JP) .............................. JP2019-189166

(51) Int. Cl.
*G03G 15/00* (2006.01)

(52) U.S. Cl.
CPC ..... *G03G 15/5004* (2013.01); *G03G 15/5016* (2013.01); *G03G 15/553* (2013.01); *G03G 15/607* (2013.01); *G03G 15/6552* (2013.01); *G03G 2215/00729* (2013.01); *G03G 2215/00911* (2013.01)

(58) Field of Classification Search
CPC .......... G03G 15/5004; G03G 15/5016; G03G 15/553; G03G 15/607; G03G 15/6552

USPC .......................................................... 399/75
See application file for complete search history.

(56) References Cited

U.S. PATENT DOCUMENTS

| 8,909,964 | B2 | 12/2014 | Narushima et al. | |
| 9,071,716 | B2 | 6/2015 | Hayamizu | |
| 9,223,275 | B2 * | 12/2015 | Totsuka | G03G 15/502 |
| 11,022,923 | B2 * | 6/2021 | Igo | G03G 15/553 |

FOREIGN PATENT DOCUMENTS

| JP | H06102733 | 4/1994 |
| JP | 2005034969 | 2/2005 |
| JP | 2013054320 | 3/2013 |
| JP | 2014108832 | 6/2014 |
| JP | 2017118255 | 6/2017 |

\* cited by examiner

*Primary Examiner* — Hoan H Tran
(74) *Attorney, Agent, or Firm* — JCIPRNET

(57) ABSTRACT

An image forming apparatus includes a unit group including a specific unit having a specific component that performs an operation necessary for notification of paper remaining on a mounting surface; and a processor configured to control supply of power to the unit group at a return from a sleep state based on a return event, in which the processor is configured to in a case where there is no paper on the mounting surface at a transition to the sleep state, perform first control to supply power to a specified power supply destination corresponding to the return event at the return from the sleep state, and in a case where there is a paper on the mounting surface at the transition to the sleep state, perform second control to supply power to the specific unit at the return from the sleep state even in a case where the specific unit is not included in the specified power supply destination of the unit group.

15 Claims, 13 Drawing Sheets

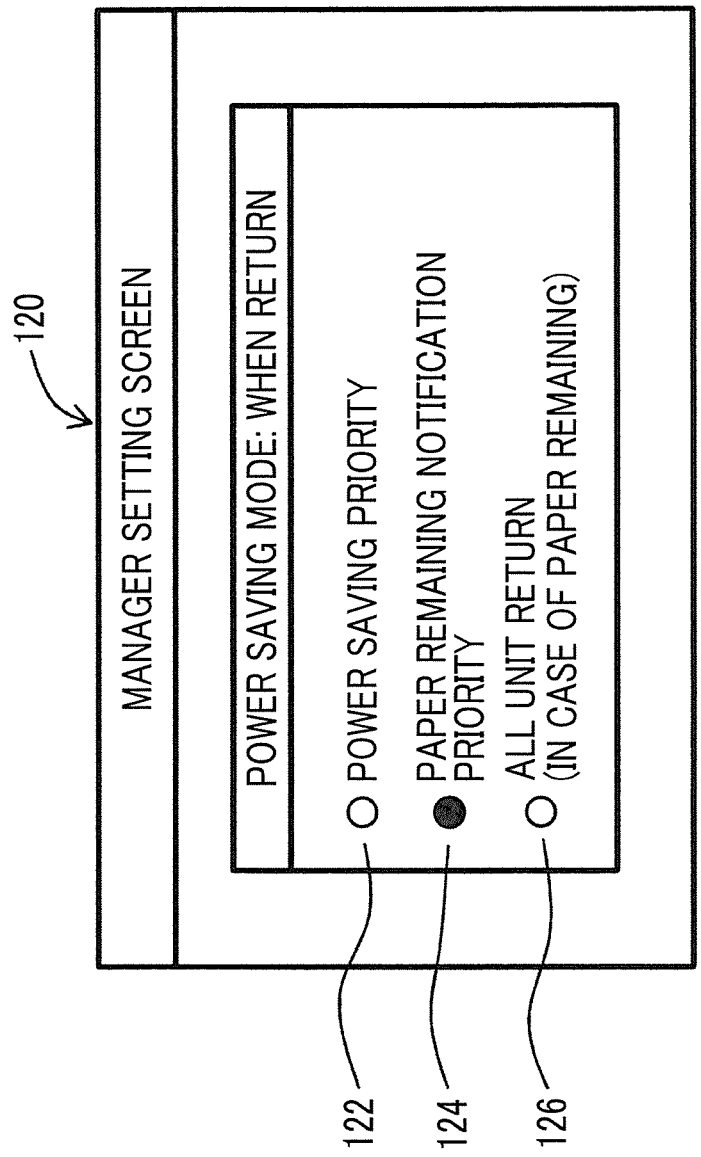

IMAGE FORMING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-189166 filed Oct. 16, 2019.

BACKGROUND

(i) Technical Field

The present invention relates to an image forming apparatus and a non-transitory computer readable medium storing a program.

(ii) Related Art

There is known an image forming apparatus provided with a light emitter that supports handling of an image-formed paper or the like. By the light emitter being turned on, the user is notified of the discharge of the paper and the presence of the discharged paper. Alternatively, by the light emitter being turned on, the discharged paper and the surroundings are illuminated. For example, in a state where a paper sensor is embedded in a mounting surface such as a discharge tray and the paper sensor detects a paper, the light emitter is turned on.

The image forming apparatus transitions to the sleep state due to an operation for power saving, an elapse of a predetermined time after execution of the final job, or the like. In that case, the power consumption of the image forming apparatus is normally at the base level or a level equivalent thereto. In the sleep state, power is not normally supplied to the paper sensor, and power is not supplied to the light emitter. In this state, at a time a predetermined return condition is satisfied, such as a case where a return operation is performed and a case where a human sensor detects a user approaching the main body, the image forming apparatus returns from a sleep state to a non-sleep state, that is, the operating state.

Partial power saving has been known as a function for power saving in an image forming apparatus (see, for example, JP2013-054320A). In the partial power saving, a part of the image forming apparatus that supplies power is adaptively changed according to the situation. In other words, from the viewpoint of power saving, power is supplied only to a part that needs to be operated, and power supply to other parts is stopped. When returning from the sleep state, power is supplied to a portion corresponding to the return event, and only that portion returns. Note that the entire image forming apparatus may return depending on the return event. However, even in such a case, the function of partial power saving is still effective, and the state after the return may be referred to as a partial power saving state.

JP2017-118255A discloses an image forming apparatus that notifies the user that removal of a document is forgotten, when returning from a power saving mode. JP2013-054320A does not specifically disclose power supply control at the time of return.

SUMMARY

In the image forming apparatus that moves to a partial power saving state when returning from the sleep state, it is necessary to supply power to a specific component that functions to notify of the paper remaining in order to notify of the paper remaining after returning. In the partial power saving, power supply is normally switched on a unit basis (that is, component group). Power needs to be supplied to a specific unit including a specific component in order to notify of the paper remaining at the time of return, but such power supply is not guaranteed in the case of partial return. At the time of return, it is considered to uniformly supply power to a specific unit including a specific component regardless of the presence or absence of a paper on the mounting surface, but in such a case, wasteful power consumption occurs.

Aspects of non-limiting embodiments of the present disclosure relate to an image forming apparatus and a non-transitory computer readable medium storing a program, which notify of a paper remaining when returning from a sleep state while suppressing unnecessary power consumption.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a unit group including a specific unit having a specific component that performs an operation necessary for notification of paper remaining on a mounting surface; and a processor configured to control supply of power to the unit group at a return from a sleep state based on a return event, in which the processor is configured to in a case where there is no paper on the mounting surface at a transition to the sleep state, perform first control to supply power to a specified power supply destination corresponding to the return event at the return from the sleep state, and in a case where there is a paper on the mounting surface at the transition to the sleep state, perform second control to supply power to the specific unit at the return from the sleep state even in a case where the specific unit is not included in the specified power supply destination of the unit group.

BRIEF DESCRIPTION OF THE DRAWINGS

Exemplary embodiment(s) of the present invention will be described in detail based on the following figures, wherein:

FIG. 13 is a diagram illustrating an example of an operation mode selection screen.

DETAILED DESCRIPTION

Figure 1:
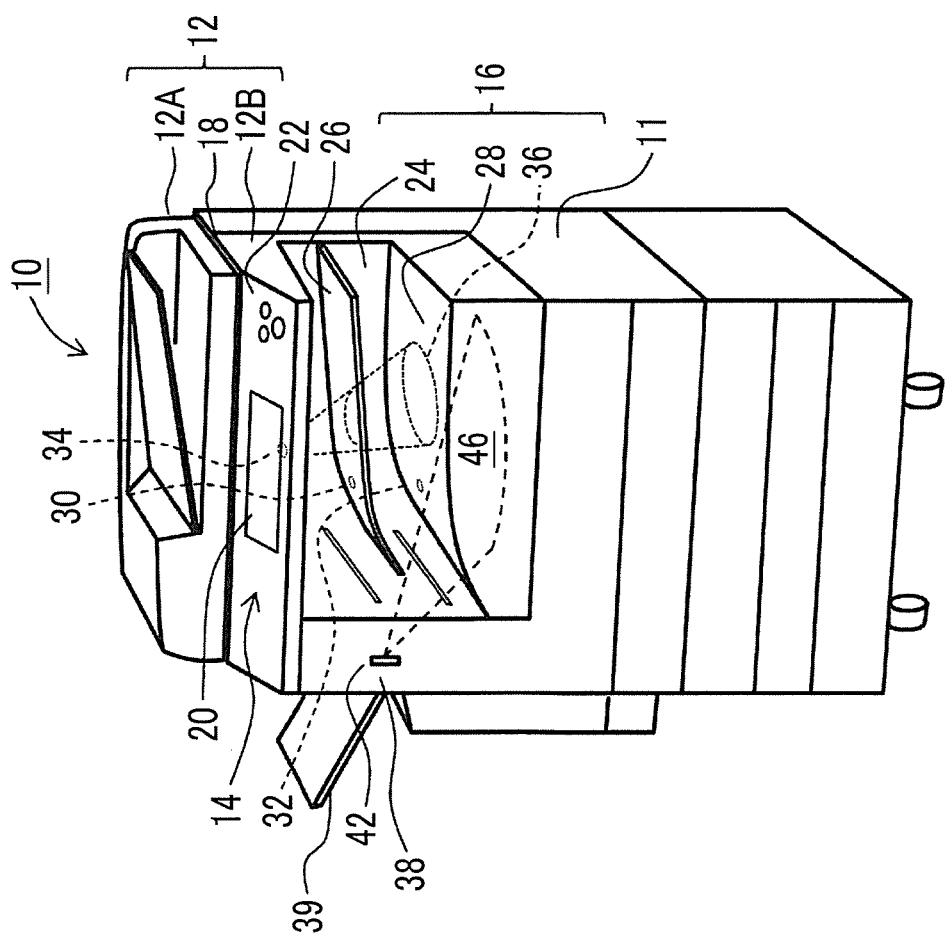
FIG. 1 is a perspective view illustrating a configuration example of an image forming apparatus according to an exemplary embodiment.

Hereinafter, exemplary embodiments will be described with reference to the drawings.

(1) Overview of Exemplary Embodiment

An image forming apparatus according to an exemplary embodiment has a unit group and a processor. The unit group includes a specific unit, and the specific unit includes a specific component that performs an operation necessary for notifying of the paper remaining on the mounting surface. The processor controls supply of power to the unit group when returning from a sleep state based on a return event. Specifically, in a case where there is no paper on the mounting surface when transition to the sleep state (that is, in the case of "transition without paper"), in the return, the processor performs a first control to supply power to the specified power supply destination corresponding to the return event. Further, in a case where there is a paper on the mounting surface when transition to the sleep state (that is, in the case of "transition with paper"), in the return, even in a case where the specific unit is not included in the specified power supply destination, the processor perform a second control to supply power to the specific unit.

The above configuration switches the power supply control or the power supply condition after the return, depending on the transition mode, that is, the transition without paper or the transition with paper. In the case of the transition without paper, normal power saving control for supplying power to the specified power supply destination corresponding to the return event after the return, that is, first control is executed. On the other hand, in the case of the transition with paper, special control for supplying power to at least the specific unit, that is, second control is executed. In the case of the transition with paper, power is supplied to the specific component after the return, so that the operation of the specific component can reliably notify of the paper remaining. The above control can reduce power consumption as compared to a case where power is uniformly supplied to the specific unit at the time of return regardless of the transition mode.

The concept of the mounting surface includes a surface on which an image-formed paper is placed, and a surface on which the image-read paper is placed. Examples of the mounting surface include a discharge tray inside the main body, a discharge tray outside the main body, a document tray, a platen, or the like. The paper on the mounting surface may be directly detected by a paper sensor or the like, or the paper on the mounting surface may be indirectly detected by a sensor or the like that specifies the operation or posture of a member that covers or surrounds the mounting surface.

Each unit constituting the unit group is a constituent unit of the image forming apparatus, and the entity is a component group. In other words, each unit is a physically existing part, that is, hardware. Normally, the presence or absence of power supply is controlled on a unit basis. Hardware including a specific component is a specific unit. The concept of a processor includes various types of hardware, devices, circuits or equipment that perform data process, as described in more detail below.

The sleep state is a state in which power consumption is reduced as compared with the state before the sleep state and the state after the return, and typically, a state where only some functions required for return (for example, a person detection section and a return control part) are operating. The return event is an event that causes a return, and corresponds to or causes a return trigger. From the viewpoint of partial power saving after the return, the configuration of the unit to be actually returned may change according to the return event. The specified power supply destination includes one or a plurality of units determined according to the return event from the viewpoint of partial power saving. The entity of the specified power supply destination is a unit list for specifying the power supply destination. In general, return is also one mode of the transition, but in the present specification, for simplicity of description, the transition from the operating state to the sleep state is referred to as "transition", and the transition from the sleep state to the operating state is referred to as "return".

In the second control that is executed in the case of the transition with paper, in a case where the specified power supply destination includes the specific unit, power is supplied to the specified power supply destination, and in a case where the specified power supply destination does not include the specific unit, power is supplied to the specific unit in addition to the specified power supply destination. This is to notify of the paper remaining while maintaining partial power saving. Alternatively, in the second control, power may be supplied to all unit groups. As a result, power is also supplied to a specific unit. This is to release the partial power saving temporarily or thereafter only in the case of the transition with paper.

In the exemplary embodiment, the specific unit is an image forming unit that forms an image on paper, A return event group that causes the return includes a predetermined return event. The predetermined return event is a specific return event having an attribute that the image forming unit is not included in the specified power supply destination corresponding thereto.

Under the above assumption, in a case of the transition with paper and where the predetermined return event occurs, by the second control, power is also supplied to the image forming unit, in addition to a specified power supply destination corresponding to the predetermined return event. The predetermined return event is, for example, detection of a person by a human sensor or an operation of releasing a sleep state. As described above, in a case where a predetermined return event occurs after the transition with paper, even in a case where the image forming unit is not required to return from the viewpoint of power saving, it is necessary to notify of the paper remaining, so that the image forming unit is included in the return target.

In the exemplary embodiment, in the second control, in a case where the specified power supply destination does not include the specific unit, the processor determines an actual power supply destination by adding the specific unit to the specified power supply destination. However, in the second control, as already described, power may be supplied to the entire unit group regardless of the contents of the return event.

For example, the specific component is a paper sensor that detects a paper on the mounting surface, and the specific unit is an image forming unit that forms an image on the paper. The mounting surface is, for example, a discharge tray on which an image-formed paper on which an image is formed by the image forming unit is placed. For example, the image forming apparatus includes a light emitter that notifies the user of the paper remaining. In that case, in a case where the paper sensor detects the image-formed paper after the return, the processor causes the light emitter to emit light.

For example, the mounting surface is a discharge tray provided in a cavity of the main body, and light is emitted toward the discharge tray by the light emitter. In a case where there is a paper on the discharge tray in the cavity, the paper and the surroundings tend to be dark, and the range in which the paper can be viewed is likely to be limited. That is, a situation where a paper is hard to notice occurs. By irradiating such a discharge tray with light, it is easy to remove the paper, and it is easy to notice the presence of paper.

In the exemplary embodiment, a return event group that causes the return includes a first return event and a second return event. The specified power supply destination corresponding to the first return event includes the image forming unit, while the specified power supply destination corresponding to the second return event does not include the image forming unit. Under this assumption, in a case where the first return event has occurred, by the first control, power is supplied to the specified power supply destination corresponding to the first return event. On the other hand, in a case where the second return event has occurred, by the second control, power is supplied to a specified power supply destination corresponding to the second return event, and power is supplied to the image forming unit. In this configuration, it is determined whether or not additional power supply is necessary according to the mode of the transition and the contents of the return event.

A plurality of specific components are provided as the specific components. In that case, in the second control, power is supplied to a plurality of specific units including the plurality of specific components, regardless of the configuration of the specified power supply destination. For example, the plurality of specific components are a paper sensor provided on the mounting surface, and a light emitter that notifies of the paper remaining. In that case, the plurality of specific units are a first specific unit including the paper sensor and a second specific unit including the light emitter. Alternatively, the plurality of specific components are a plurality of paper sensors provided on a plurality of mounting surfaces. In that case, the plurality of specific units are a plurality of units including the plurality of paper sensors.

In the case where power supply is switched on and off for each component, the configuration and control become considerably complicated. On the other hand, by switching the power supply on or off for each unit, the configuration and control are simplified. The above configuration reliably notifies the user of paper remaining under such an assumption.

An image forming apparatus according to an exemplary embodiment has a unit group and a processor. The unit group includes a specific unit, and the specific unit includes a specific component that performs an operation necessary for notifying of the paper remaining on the mounting surface. The processor controls supply of power to the unit group at a time of returning from a sleep state. More specifically, in a case of the transition without paper and where a return event occurs in the sleep state; and in a case of the transition with paper and where the specified power supply destination corresponding to the return event includes a specific unit, the processor supplies power to the specified power supply destination. On the other hand, in a case of the transition with paper and where the specific unit is not included in a specified power supply destination corresponding to the return event, power is also supplied to the specific unit, in addition to the specified power supply destination. In this configuration, partial power saving is performed while giving priority to notification of paper remaining.

The power supply control method according to the exemplary embodiment is a method executed in the image forming apparatus. The image forming apparatus includes a unit group including a specific unit having a specific component that performs an operation necessary for notification of paper remaining on a mounting surface, The power supply control method includes a first control step and a second control step. In the first control step, in the case of transition without paper, in a case of returning from the sleep state, power is supplied to the specified power supply destination corresponding to the return event. In the second control step, in the case of the transition with paper, in a case of returning from the sleep state, power is supplied to the specific unit even in a case where the specified power supply destination corresponding to the return event does not include the specific unit.

The above method is implemented as a hardware function or a software function. In the latter case, a program for executing the above method is installed in the information processing apparatus via a portable storage medium or via a network.

(2) Details of Exemplary Embodiment

FIG. 1 illustrates a configuration example of an image forming apparatus according to an exemplary embodiment. The illustrated image forming apparatus 10 is a multifunctional apparatus having a print function, a scanner function, a copy function, a facsimile function, and the like. Each technique described below may be incorporated into an image forming apparatus having some of these functions or an apparatus having other functions.

The image forming apparatus 10 has a power saving priority mode, a paper remaining notification priority mode, and an all unit return mode as operation modes selectively applied at a time of returning from the sleep mode, regarding partial power saving. The power supply is controlled at the time of return, according to the operation mode selected from among the modes. Hereinafter, the configuration and operation of the image forming apparatus 10 will be described on the assumption that the paper remaining notification priority mode is selected.

In FIG. 1, an x direction is a first horizontal direction as a depth direction or a front-back direction, a y direction is a second horizontal direction as a left-right direction, and a z direction is a vertical direction as a up-down direction. These three directions are orthogonal to each other.

In FIG. 1, the image forming apparatus 10 includes a plurality of units that are functionally and physically separated, that is, a unit group. Specifically, the image forming apparatus 10 has a main body 11 which forms a main part or is a basic part. The main body 11 has generally a box shape as a whole, and in the illustrated configuration example, the main body 11 includes an image reading unit 12, a user interface (UI) unit 14, an image forming unit 16, or the like. A control unit, a sensor substrate, or the like are also provided in the main body 11, but are not illustrated in FIG. 1. Each unit is a constituent unit and corresponds to a component group. In the partial power saving, the presence or absence of power supply is controlled on a unit basis.

In the illustrated configuration example, the image reading unit 12 includes an upper reading unit 12A and a lower reading unit 12B. The upper reading unit 12A includes an automatic document feeder or an automatic document reading device that reads an image from each document while sequentially transmitting a plurality of documents. The upper reading unit 12A has a document tray on which a document to be read is set and a discharge tray for discharging the document after reading. Each of these trays is provided with a paper sensor for determining the presence or absence of paper, but the paper sensor is not illustrated in FIG. 1. The upper reading unit 12A performs an opening and closing motion using a hinge portion provided on the back side of the main body 11 as a rotation axis. An open and close sensor (not illustrated) is provided at the hinge portion.

The lower reading unit 12B reads an image from a document placed on the platen 18. In a case where a document is placed on the platen 18, the entire platen 18 is covered by the upper reading unit 12A. At this time, the upper reading unit 12A functions as a document cover. In a case where the document remains on the platen 18 after reading the image, it is possible to determine the remaining from the output signal of the open and close sensor. It may be determined whether or not the document remains by irradiating the document with light from the inside of the platen 18.

The UI unit 14 includes a touch screen panel 20. The touch screen panel 20 includes a display device and an input device. A removable touch screen panel 20 may be employed. In that case, a so-called tablet terminal may be used as the touch screen panel 20. The display device is, for example, an LCD, which has a backlight. In the exemplary embodiment, a light emitter 34 described later constitutes one component in the UI unit 14 as a component group. In a case where the power supply to the UI unit 14 is interrupted, the light emitter 34 enters a state where the operation is stopped.

The button group 22 includes a power button, a power saving button, or the like. In a case where the power saving button is operated, the state transitions to the sleep state. The transition to the sleep state may be caused by another event such as a timeout, with a time of the execution of the final job as a criterion. In the sleep state, in a case where a return event occurs, the state returns from the sleep state to the operating state (specifically, a partial power saving state).

The return event group includes an operation of a power saving button (that is, an operation of releasing sleep), detection of a person, and reception of a print job. The configuration of the unit that supplies power in the partial power saving state changes depending on the content or type of the generated return event. One or a plurality of units to which power is supplied are specified power supply destinations.

The image forming unit 16 is a unit that forms an image on a paper according to an electrophotographic method, and includes a transfer unit, a fixing unit, and the like. A plurality of paper feed trays are provided below the image forming unit 16.

In the main body 11, a horizontal groove-shaped cavity 24 is formed between the image forming unit 16 and the lower reading unit 12B. One surface in the x direction and one surface in the y direction of the cavity 24 are open surfaces. In the illustrated configuration example, an upper discharge tray 26 and a lower discharge tray 28 are provided in the cavity 24. The image-formed paper is discharged and placed on the discharge trays. Only one of the upper discharge tray 26 and the lower discharge tray 28, for example, the latter may be provided. Note that the plurality of trays (including the discharge trays 26 and 28) and the platen 18, which have already been described, are paper mounting surfaces, respectively.

A paper sensor 30 is provided in the upper discharge tray 26, and the presence or absence of a paper on the upper discharge tray 26 is determined based on the level of the output signal. The lower discharge tray 28 is provided with a paper sensor 32, and the presence or absence of a paper on the lower discharge tray 28 is determined based on the level of the output signal. The paper sensors 30 and 32 are configured with, for example, an optical sensor, a micro switch, or the like.

In the exemplary embodiment, the two paper sensors 30 and 32 constitute a part of the image forming unit 16. That is, a part of the power supplied to the image forming unit 16 is supplied to the two paper sensors 30 and 32. Each of the two paper sensors 30 and 32 is one component in the image forming unit 16 as a component group. In the sleep state, in a case where the power supply to the image forming unit 16 is stopped, the power supply to the two paper sensors 30 and 32 is also stopped, and the paper sensors stop operating.

In a case where the image forming unit 16 is included in the specified power supply destination corresponding to the return event at the time of return from the sleep state, the power supply to the image forming unit 16 is restarted. At that time, the power supply to the two paper sensors 30 and 32 is also restarted. On the other hand, in a case where the image forming unit 16 is not included in the specified power supply destination corresponding to the return event at the time of return from the sleep state, the power is not supplied to the image forming unit 16 in a case where any special control is not performed. Therefore, in the exemplary embodiment, in a case where the notification of the paper remaining is required at the time of return, the power is supplied to the image forming unit including the two paper sensors 30 and 32 at the time of return. This will be described in detail later.

In the main body 11, a light emitter 34 is provided on the ceiling surface of the cavity 24. For example, in a case where a paper is present in one of the two discharge trays 26 and 28, in other words, in a case where the paper sensors 30 and 32 are operating and at least one of the paper sensors 30 and 32 detects the paper, the light emitter 34 is turned on. Thus, the light beam 36 is emitted from the light emitter 34 toward the two discharge trays 26 and 28. For example, the light emitter 34 is configured by an LED. The upper discharge tray 26 is formed of a transparent member, which transmits the light beam 36. Alternatively, the light beam 36 is formed so as to straddle the two discharge trays 26 and 28.

When the light beam 36 is applied, the inside of the cavity 24 becomes bright, and the visibility of the paper is improved. Further, the generation of the light beam 36 makes it possible to recognize the presence of the paper in the cavity 24. For example, the light emitter 34 starts a blinking operation from the start of discharging the paper, and maintains a lighting state for a certain period of time after the discharging of the paper is completed. Of course, this operation mode is only an example. Note that a plurality of light emitters can be provided inside or around the cavity 24. For example, a light emitter may be provided for each discharge tray, and notification and illumination may be individually performed for each discharge tray.

In the main body 11, a pillar portion 38 as a wall portion is provided at a position adjacent to the cavity 24. On the side surface of the pillar portion 38 facing the cavity 24, two paper discharge slits are formed vertically side by side. In the illustrated configuration example, a human sensor 42 is built in the pillar portion 38. Actually, a sensor substrate including the human sensor 42 is disposed inside the pillar portion 38, and an opening for transmitting light is formed on the front surface of the pillar portion 38.

The human sensor 42 is, for example, a reflection sensor as an object sensor. The human sensor 42 includes a light emitter and a light receiver and is an active sensor. In the example illustrated in FIG. 1, the detection range 46 of the second human sensor is limited to a local range on the front side of the main body 11. As the human sensor 42, a passive sensor such as a pyroelectric sensor may be used. The human sensor 42 may be disposed at a position other than the illustrated position.

A primary human sensor that operates preliminarily and a secondary human sensor that is activated in a case where the primary human sensor detects a person may be provided. In that case, the secondary human sensor is the main sensor for detecting a person. For example, the detection range 46 may be set as the detection range of the secondary human sensor, and the detection range of the primary human sensor may be set to a wider range including the detection range 46.

Note that the side tray 39 is a discharge tray provided outside the main body 11. Still another discharge tray may be provided. A finisher or the like may be provided at a position adjacent to the main body 11.

Figure 2:
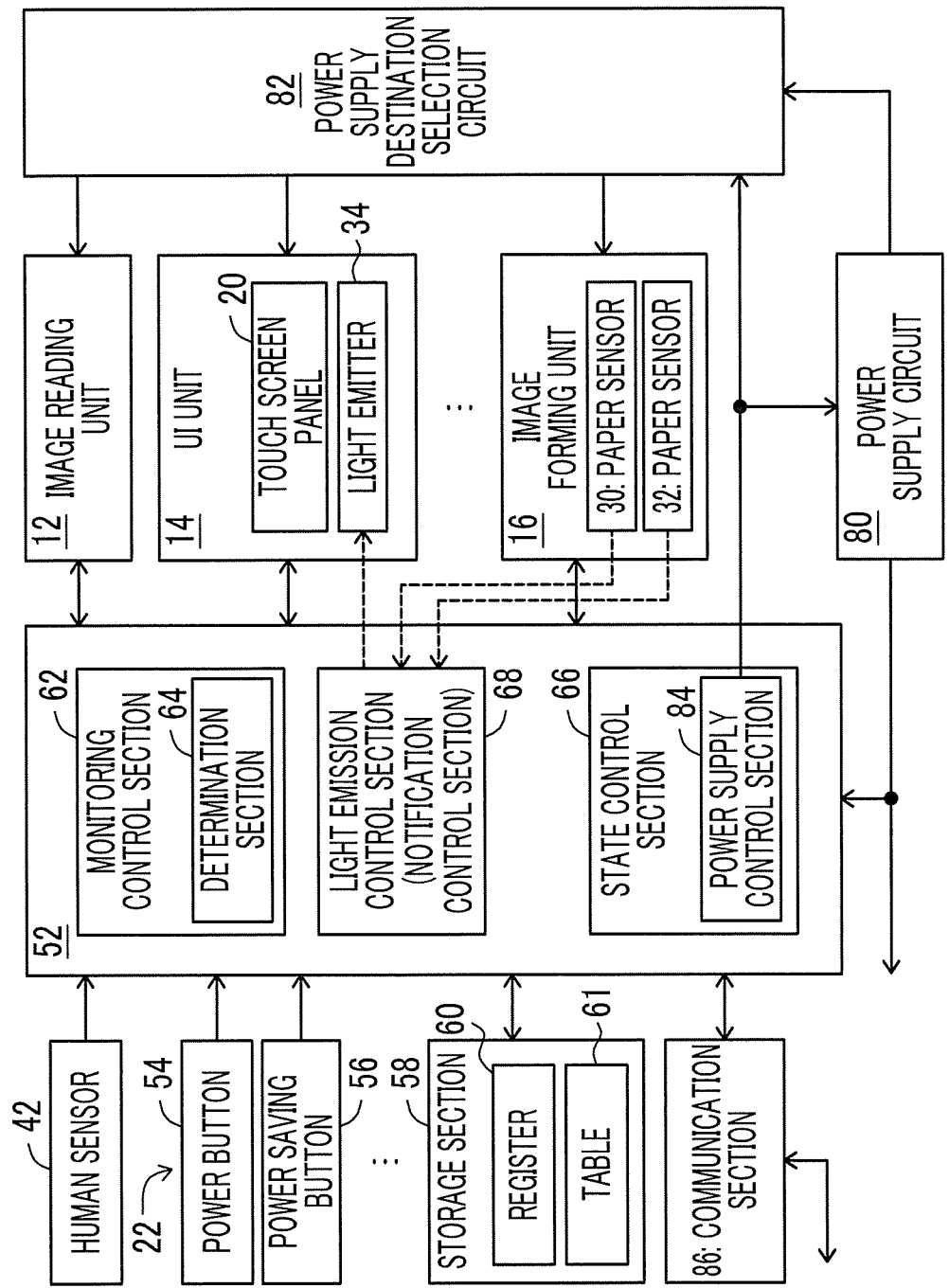
FIG. 2 is a block diagram illustrating an image forming apparatus according to the exemplary embodiment.

FIG. 2 is a block diagram of the image forming apparatus illustrated in FIG. 1. The processor 52 is an electronic circuit that processes information, and corresponds to a control section, which constitutes a main part of the control unit. The control unit also includes a storage section 58. A part of the storage section 58 functions as a register 60 and a management table 61 described later. The program executed by the processor 52 can be stored in the storage section 58.

The processor 52 has a plurality of functions, of which main functions are represented by a plurality of blocks in FIG. 2. Specifically, FIG. 2 illustrates a monitoring control section 62, a state control section 66, and a light emission control section 68. The light emission control section 68 functions as a notification control section.

The processor 52 controls the operation of a unit group including the image reading unit 12, the UI unit 14, the image forming unit 16, or the like. Specifically, the state control section 66 includes a power supply control section 84, and the power supply control section 84 controls the operations of the power supply circuit 80 and the power supply destination selection circuit 82. The power supply circuit 80 is a circuit that generates a plurality of power supply voltages required in the image forming apparatus. A plurality of power supply voltages are supplied to the unit group. The power supply destination selection circuit 82 is provided for performing partial power saving, and is a circuit that can select whether to supply power on a unit basis.

The power supply control section 84 restricts the operation of the control unit or the power supplied thereto such that the control unit is set to the base state in the process of transition to the sleep state. Thus, a sleep state in which only a part of the control unit operates and the other parts are inactive is formed. That state is also the sleep state of the image forming apparatus.

In a case where a return event occurs in the sleep state, the power supply control section 84 controls the return to the operating state. Specifically, through the control of the power supply destination selection circuit 82, the necessary power supply to one or a plurality of units constituting the specified power supply destination corresponding to the return event is restarted to form a partial power saving state. Depending on the return event, the power supply to all units is restarted, but even in such a case, the partial power saving function is enabled, and the partial power saving state is not changed. Note that, even in the sleep state, the operation of the part relating to the detection of a person is maintained, and the operation of the part required for the return control in the processor 52 is maintained.

The UI unit 14 includes a touch screen panel 20 and a light emitter 34. In the sleep state, power is not supplied to the UI unit 14. That is, the light emitter 34 does not operate. The image forming unit 16 has two paper sensors 30 and 32. In the sleep state, power is not supplied to the image forming unit 16, that is, power is not supplied to the two paper sensors 30 and 32.

The output signal of the human sensor 42 is input to the processor 52. The human sensor 42 is mounted on a sensor substrate (not illustrated). A circuit that processes the output signal is mounted on the sensor substrate. The monitoring control section 62 in the processor 52 monitors the presence or absence of the detection of a person in the sleep state, and generates a return trigger in a case where a person is detected. That is, the monitoring control section 62 instructs the state control section 66 to return. More specifically, the monitoring control section 62 includes a determination section 64. The determination section 64 determines that the user approaching the main body has been detected, based on the output signal of the human sensor 42 in the sleep state.

The detection of a person may be determined in the signal processing circuit provided on the sensor substrate. For example, the signal processing circuit may determine that the user has been detected by comparing the output signal of the human sensor 42 with a threshold. Note that the human sensor 42, the signal processing circuit, and the determination section 64 correspond to a person detection section. However, in the case where the signal processing circuit employs a configuration capable of determining the detection of a predetermined person, the human sensor 42 and the signal processing circuit correspond to a person detection section. In a case where the human sensor can determine the detection of a predetermined person, the human sensor corresponds to the person detection section.

The button group 22 is connected to the processor 52. The button group 22 includes a power button 54 and a power saving button 56. In a case where the power saving button 56 is operated in the normal operating state, control for transition to the sleep state is executed. Subsequently, in a case where the power saving button is operated in the sleep state, control for returning to the operating state is executed. It can be said that the latter operation is an operation for instructing return.

The return event group includes various return events such as detection of a person by a human sensor, an operation for instructing return, and reception of a print job from an information processing apparatus. As already described, the specified power supply destination for partial power saving changes according to the contents of the return event. Note that the print job is a print instruction, and the print job normally includes document data to be printed.

Apart of the storage section 58 functions as a register 60. In the exemplary embodiment, when transition to the sleep state, in a case where neither of the paper sensors 30 and 32 detects a paper, 0 is set in the register 60 as a flag indicating that there is no paper. On the other hand, when transition to the sleep state, in a case where one of the paper sensors 30 and 32 detects paper, 1 is set in the register 60 as a flag indicating that there is a paper. Note that the data stored in the storage section 58 is retained even in the sleep state.

In the illustrated configuration example, a management table 61 is constructed on the storage section 58. The management table 61 is a table for managing a specified power supply destination corresponding to each type of return event. In the case of the transition without paper, at the time of return, power is supplied to one or a plurality of units constituting a specified power supply destination. On the other hand, in the case of the transition with paper, power is supplied to the specified power supply destination at the time of return. At this time, even in a case where the specified power supply destination does not include the image forming unit 16, power is additionally supplied to the image forming unit 16. Thus, at the time of return, power is supplied to the two paper sensors 30 and 32, and the two paper sensors 30 and 32 become operable. At the time of return, power is normally supplied to the UI unit 14, so that when return, the light emitter 34 becomes operable. The UI unit 14 may return with the backlight turned off. As will be described later, in the exemplary embodiment, in a case where the apparatus returns by receiving the print job, the UI unit 14 is not included in the specified power supply destination. However, in a case where the print job is received after the transition with paper, in a case of return, power is additionally supplied to the UI unit 14. This is because the UI unit 14 includes the light emitter 34 that functions to notify of the paper remaining.

In a normal operating state, in a case where a paper is detected by at least one of the paper sensors 30 and 32, the light emission control section 68 executes control to turn on the light emitter 34 (see a broken line in FIG. 2). Thus, the light beam is emitted toward the two discharge trays in the cavity. Similarly, at the time of return after the transition with paper, in a case where a paper is detected by at least one of the paper sensors 30 and 32, the light emission control section 68 executes control to turn on the light emitter. Thus, the user is notified of the paper remaining. The paper remaining may be notified of by outputting sound from a speaker, displaying a message on a display device, or the like.

The communication section 86 is a module for communicating with the information processing terminal via a network. The print job sent from the information processing terminal is received by the processor 52 via the communication section 86.

Figure 3:
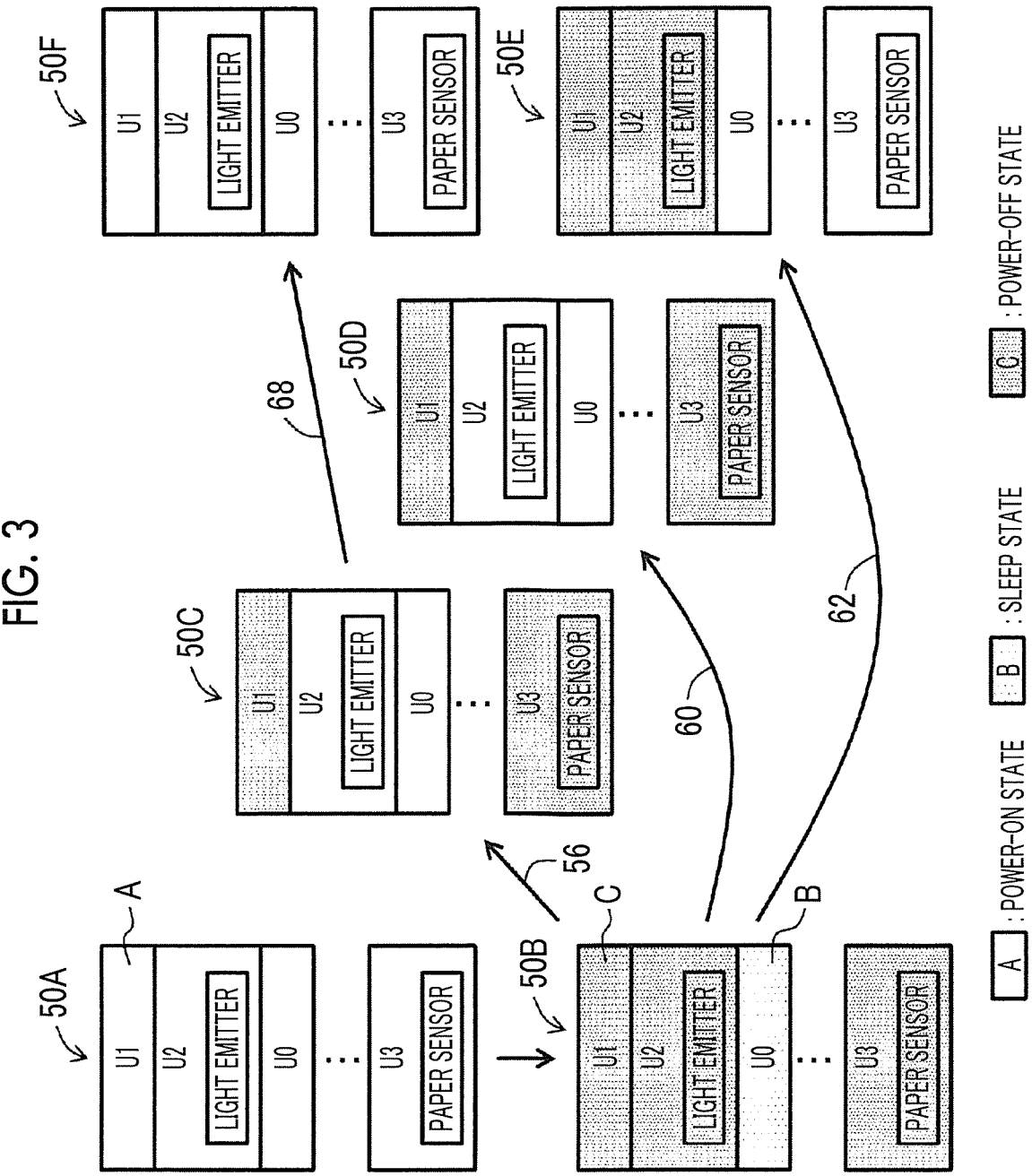
FIG. 3 is a diagram illustrating a state change according to a comparative example.

FIG. 3 illustrates a state change according to the comparative example. In the comparative example, there is no distinction between the transition without paper and the transition with paper. In FIG. 3, U0, U1, U2, and U3 each indicate a unit. These units form a unit group. Specifically, U0 indicates a control unit, and U1 indicates an image reading unit. U2 indicates a UI unit. The UI unit U2 includes a light emitter. U3 indicates an image forming unit. The image forming unit U3 includes a paper sensor in the illustrated example. In the configuration illustrated in FIG. 1 or the like, the image forming unit has two paper sensors, but in FIG. 3, the image forming unit U3 has one paper sensor. The unit group may include a finisher that performs post-process on paper.

Note that the boxes represented in white indicate units in the power-on state, that is, a state in which power is supplied (see A). The units expressed in gray indicate a power-off state, that is, a state in which power is not supplied (see C). The boxes represented by the intermediate luminance indicate the sleep state (see B).

Reference numeral 50A indicates a state before the transition. In the illustrated example, although partial power saving is performed, power is supplied to all units, and all units are in a normal operating state. Reference numeral 50B indicates a sleep state. The control unit U0 is in a sleep state, and all the other plurality of units are in a non-operating state. The entire image forming apparatus is in a sleep state. In the sleep state, only the minimum configuration operates, and the power consumption of the image forming apparatus becomes the base level or a level equivalent thereto.

In a case where the button for instructing return is operated as indicated by reference numeral 56, the entire control unit U0 enters an operating state as indicated by reference numeral 50C. Further, power is supplied to the UI unit U2, and the UI unit U2 enters an operating state. The non-operating state is maintained for other units.

In a case where a person is detected as indicated by reference numeral 60, the entire control unit U0 enters an operating state as indicated by reference numeral 50D. Further, power is supplied to the UI unit U2, and the UI unit U2 enters an operating state. However, priority is given to power saving, and the backlight remains off. After the UI unit U2 returns, the backlight is turned on at a time the user touches the touch screen panel. Of course, the backlight may be turned on at the time of return. The non-operating state is maintained for other units.

In a case where a print job is received as indicated by reference numeral 62, the entire control unit U0 enters an operating state as indicated by reference numeral 50E. Further, power is supplied to the image forming unit U3, and the image forming unit U3 enters an operating state. On the other hand, the image reading unit U1 and the UI unit U2 remain in the power-off state.

As indicated by reference numeral 68, in a case where a copy operation or the like is performed after the return, necessary units further enter an operating state. In the example illustrated in FIG. 3, as indicated by reference numeral 50F, all units are in the operating state, that is, power is supplied to all units.

In the comparative example, in a case of returning based on the operation of the button for instructing return and detection of a person, power is not supplied to the image forming unit U3, and power is not also supplied to the paper sensor included therein. At the time of return, power is supplied to the light emitter, but as long as the paper sensor does not operate, even in a case where paper remains on the discharge tray, it is not possible to notify of the paper remaining at that time. In the case of returning based on the reception of the print job, since the power is supplied to the image forming unit U3, but the power is not supplied to the UI unit U2, also in such a case, the paper remaining cannot be notified of similarly to the above.

Figure 4:
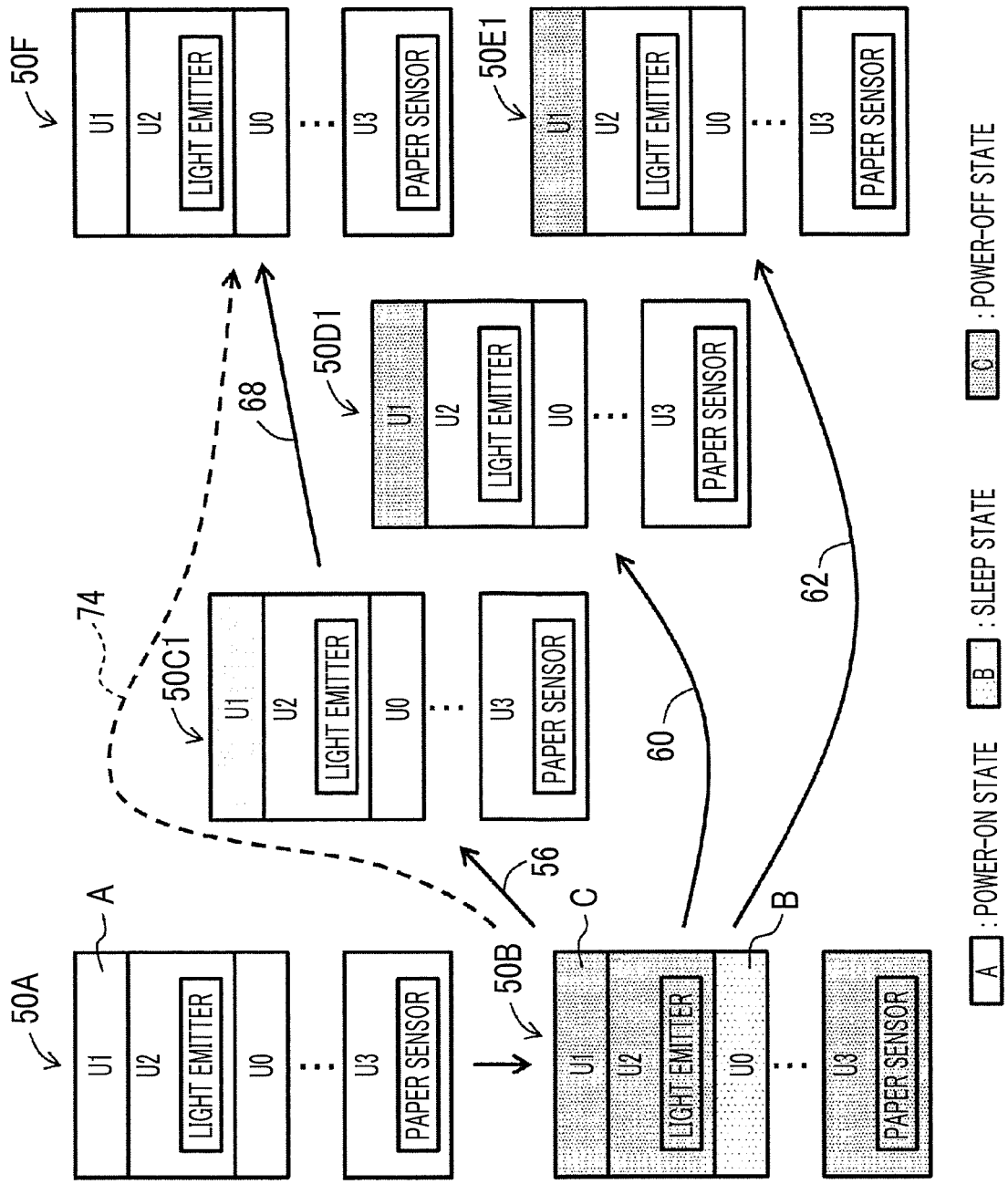
FIG. 4 is a diagram showing a state change according to the exemplary embodiment.

FIG. 4 illustrates a state change according to the exemplary embodiment. In FIG. 4, the same reference numerals are given to the elements already described, and the description thereof will be omitted. FIG. 4 is based on the assumption of the transition with paper under partial power saving.

Reference numeral 50B indicates a sleep state after the transition. As indicated by reference numeral 56, in a case where the button for instructing the return is operated, as shown by reference numeral 50C1, in the comparative example, the image forming unit U3, which has not returned, receives power and returns. Power is supplied to the paper sensor. At the time of return, in a case where a paper remains, the light emitter is turned on to notify of the paper remaining. At the time of return, power is supplied to the UI unit U2, that is, at the time of return, the light emitter is in an operable state.

In a case where the detection of a person is determined, as indicated by reference numeral 60, as in the above case, as shown by reference numeral 50D1, the image forming unit U3, which normally does not return, also receives power and returns. Even in this case, in a case where power is supplied to the paper sensor and the paper remains, the light emitter is turned on at the time of return, thereby notifying the user of the paper remaining. In a case where a print job is received, as indicated by reference numeral 62, in the comparative example, the UI unit U2, which does not return, receives power and returns, as indicated by reference numeral 50E1. At this point, in a case where a paper remains, the paper remaining is detected by the paper sensor and the light emitter is turned on, thereby notifying of the paper remaining.

As described above, in the exemplary embodiment, in the case of the transition with paper, even in a case where the specified power supply destination corresponding to the return event does not include a specific unit such as an image forming unit or a UI unit (that is, a unit provided with a specific component that functions to notify of the paper remaining), power is also supplied to the specific unit when returning. Thus, the user is notified of the paper remaining in a timely manner. Since it is necessary to switch the control at the time of return, it is determined whether the transition is transition with paper or transition without paper, and the determination result is recorded as a flag. Note that, in the exemplary embodiment, in the case of transition without paper, a state change similar to the comparative example illustrated in FIG. 3 is performed.

In the case of the transition with paper as indicated by reference numeral 74, power may always be supplied to all units at a time of return, as indicated by reference numeral 50F. For example, partial power saving may be automatically released. This will be described later.

Figure 5:
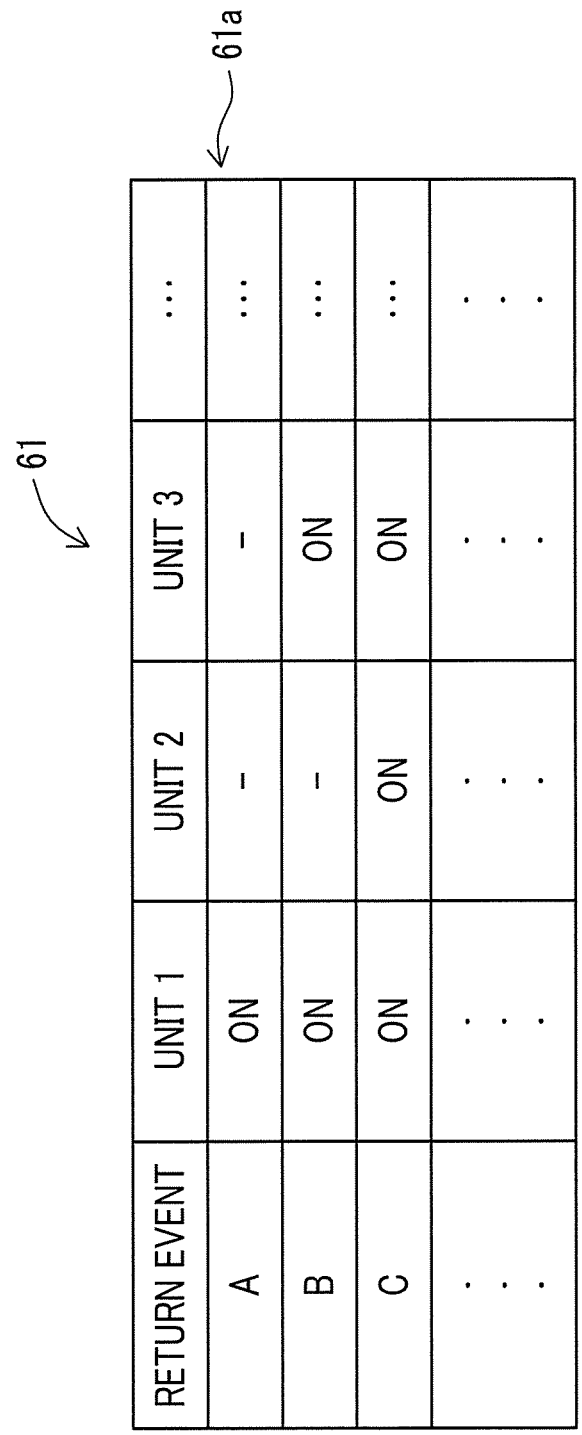
FIG. 5 is a diagram illustrating a configuration example of a management table.

FIG. 5 illustrates a configuration example of the management table. The management table 61 includes a plurality of records 61a, and each record 61a includes data indicating a specified power supply destination corresponding to each return event. The entity of the data is a power supply target list, that is, a unit list. In FIG. 5, in a case where a return event occurs, power is supplied to the unit indicated by ON in the record corresponding to the event. By referring to the management table 61, a unit to which power is supplied can be specified for each return event. Of course, the specified power supply destination for each return event may be managed by another method.

Figure 6:
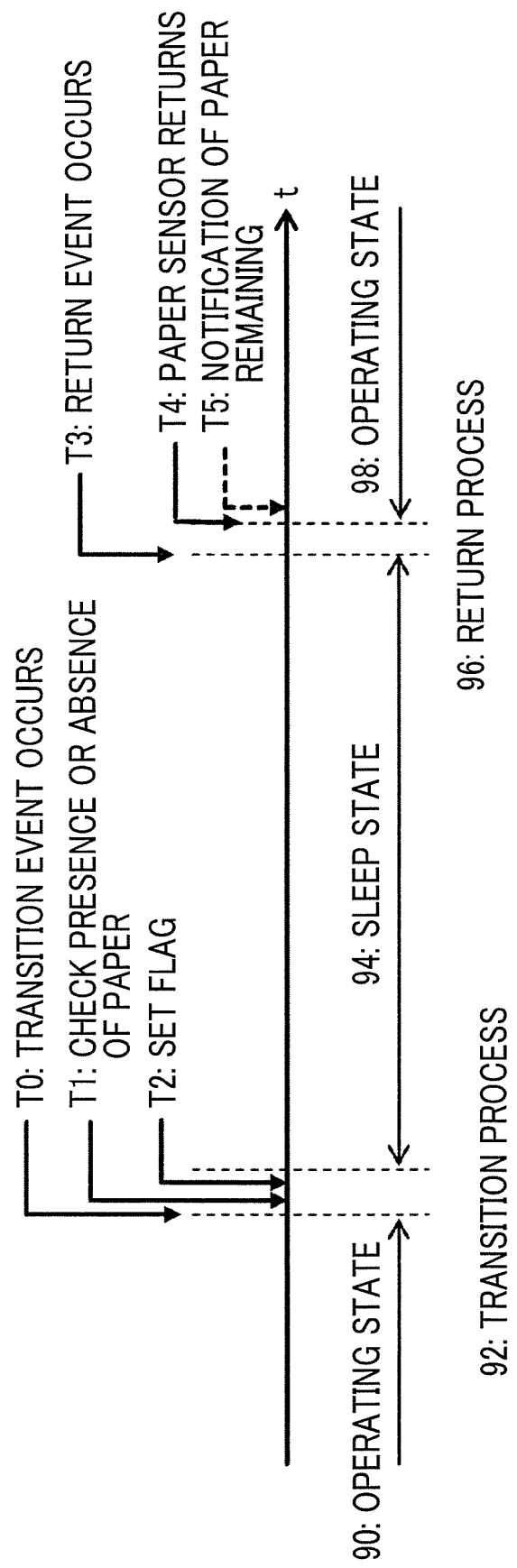
FIG. 6 is a timing chart illustrating an operation sequence.

FIG. 6 illustrates an operation sequence according to the exemplary embodiment. The following focuses on the image forming unit as a specific unit. In the operating state 90, in a case where a transition event occurs at the timing T0, the state changes to the sleep state 94 through the transition process 92. In the transition process 92, the presence or absence of a paper on the discharge tray is checked at a timing T1 based on the output signal of the paper sensor, and a flag is set at a timing T2. In a case where there is no paper, 0 is set as a flag, and in a case where there is a paper, 1 is set as a flag.

In the sleep state 94, in a case where a return event occurs at the timing T3, the state returns to the operating state (specifically, the partial power saving state) via the return process 96. In a case of return, the value of the flag is referred to. In a case where the flag is 0, the specified power supply destinations corresponding to the return event receive power and return. In a case where the flag is 1, it is determined whether or not the specified power supply destination corresponding to the return event includes an image forming unit. At that time, the management table is referred to. In a case where it is determined that an image forming unit is included, power is supplied to a specified power supply destination. On the other hand, in a case where it is determined that an image forming unit is not included, power is supplied to the specified power supply destination and the image forming unit. That is, one power supply target is added. Specifically, an actual power supply target is determined by adding the image forming unit to the specified power supply destination. The paper sensor returns at timing T4, and in a case where the paper sensor detects the paper, the user is notified of the paper remaining at timing T5.

As described above, in the exemplary embodiment, in the case of the transition with paper, even in a case where the specified power supply destination corresponding to the return event does not include the image forming unit, the power is supplied to the image forming unit at the time of return. In a case where the paper remains at the time of return, the paper is detected by the paper sensor, and the user is notified of the paper remaining based on the detection. The notification prompts the paperwork for the paper as soon as possible.

Regardless of the presence or absence of paper at the time of transition, it is considered to always return all units or always return the image forming unit at the time of return, but in this case, waste of power consumption occurs in the case of the transition without paper. On the other hand, in the above-described exemplary embodiment, both the power saving and the paper remaining notification are achieved.

As already described, sound may be output from the speaker instead of or together with the light emission. The notification may be performed by displaying a message on the display device. In a case of performing notification by the light emitter, blinking may be employed instead of continuous lighting. In the above-described exemplary embodiment, the two discharge trays in the cavity are subjected to the management of the paper remaining, but another mounting surface, for example, another discharge tray, a document tray (including a platen), or the like may be subjected to the management of the paper remaining.

At the time of return, in a case where the supply of power to the unit including the light emitter (specifically, the UI unit) is not guaranteed, as in the above case, in the case of the transition with paper, power may be supplied to the unit at the time of return. In general expression, in a case where transition with paper occurs under partial power saving, power supply control may be performed such that at a time of following return, power is supplied to a specific unit provided with a specific component that functions to notify of the paper remaining. In a case where there are a plurality of specific units including a plurality of specific components, power is supplied to the units at the time of return.

Hereinafter, an operation of the image forming apparatus according to the exemplary embodiment, particularly, an operation at the time of transition and an operation at the time of return will be described. The following shows the contents of the control of the processor as the control section.

Figure 7:
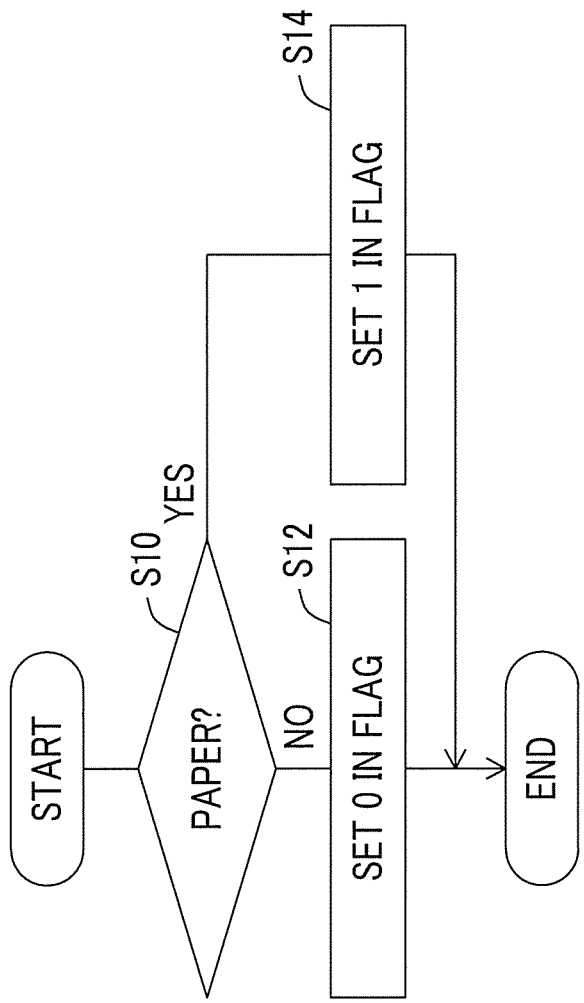
FIG. 7 is a flowchart illustrating an operation in a transition process.

FIG. 7 illustrates the operation in the transition process as a flowchart. In S10, it is determined whether or not there is a paper in any of the two discharge trays to be managed. In a case where it is determined that there is no paper, 0 is set in the flag in S12. In a case where it is determined that there is a paper, 1 is set in the flag in S14. Other units may be used instead of the management using the flag.

Figure 8:
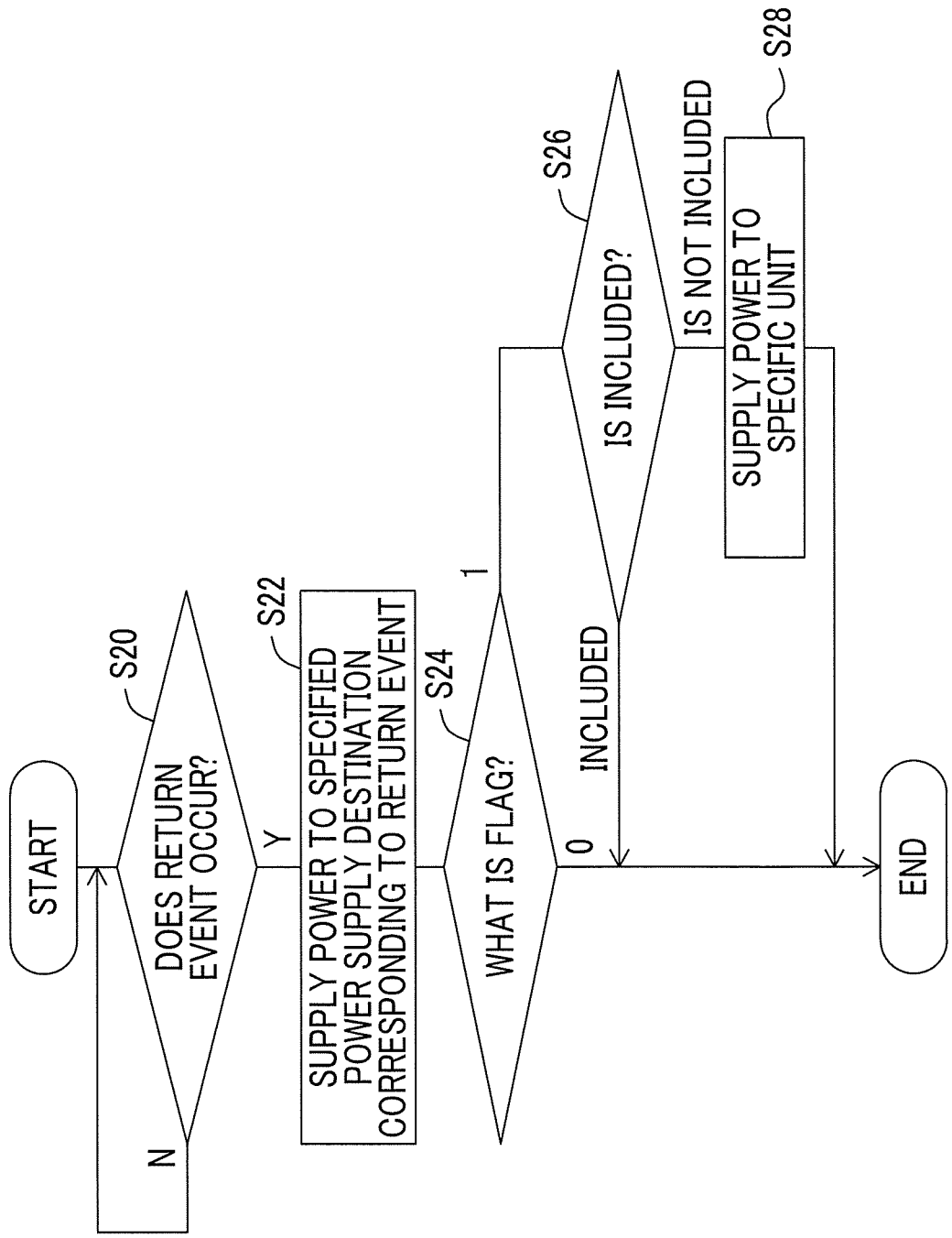
FIG. 8 is a flowchart illustrating a first operation example in a return process.

FIG. 8 illustrates the first operation example in the return process as a flowchart. In a case where it is determined in S20 that the return event has occurred, the management table is referred to in S22, a specified power supply destination corresponding to the return event is specified, and power is supplied to one or a plurality of units constituting the destination. Then, it is determined in S24 whether the flag is 0 or 1, and in a case where the flag is 1, it is determined in S26 whether or not a specific unit (for example, an image forming unit or a UI unit) is included in the specified power supply destination. In a case where the specific unit is not included, power is additionally supplied to the specific unit in S28.

Figure 9:
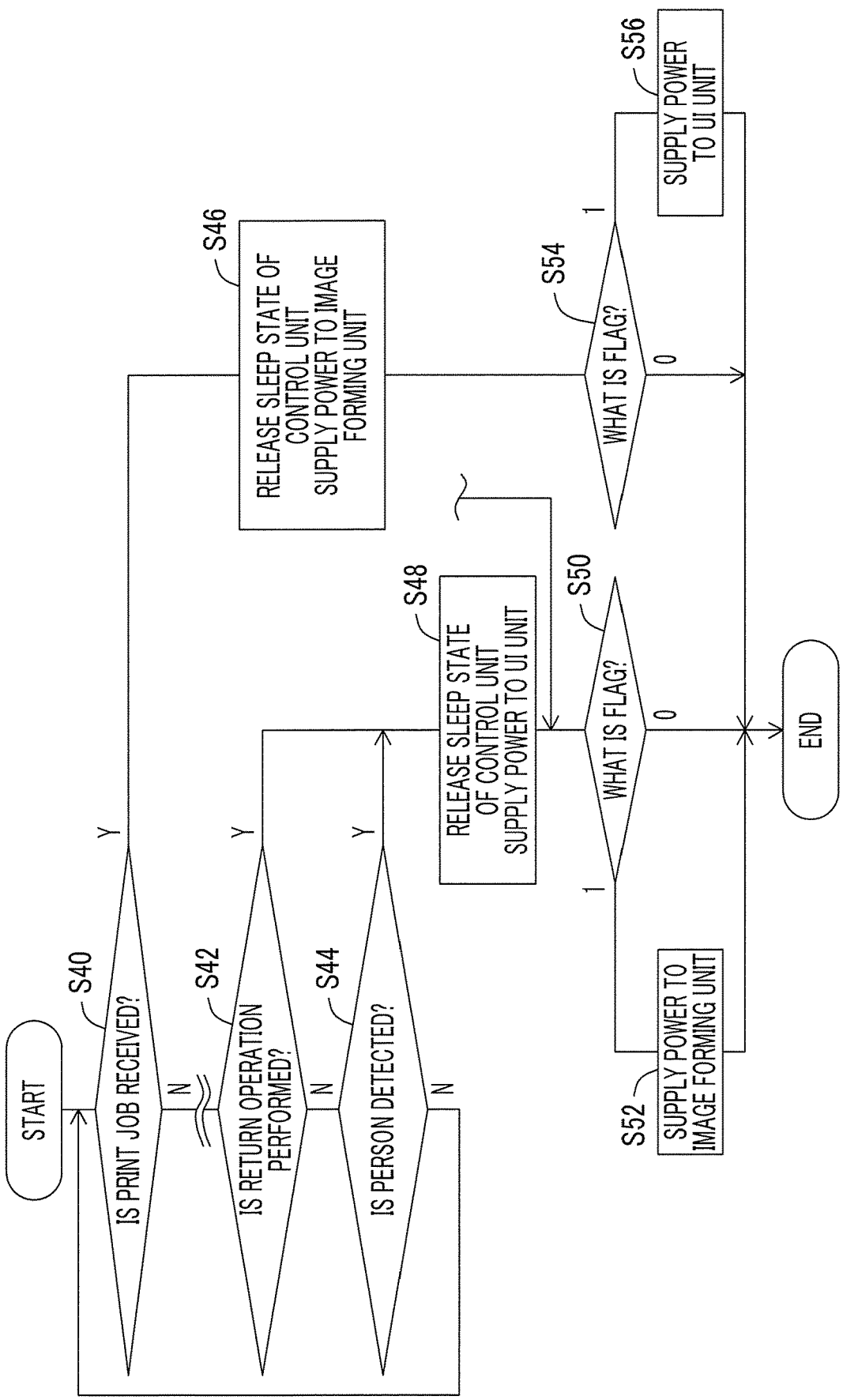
FIG. 9 is a flowchart illustrating a second operation example in the return process.

FIG. 9 illustrates the second operation example in the return process as a flowchart. The second operation example corresponds to a more specific example of the first operation example. In S40, S42, and S44, it is determined whether or not any return event constituting the return event group has occurred. Specifically, it is determined in S40 whether or not a print job has been received, it is determined in S42 whether or not a return operation has been performed, and the detection of a person is determined in S44.

In a case where it is determined in S40 that a print job has been received, S46 is executed. S46 is based on the assumption that the specified power supply destination includes the image forming unit but does not include the UI unit. Specifically, in S46, the sleep state of the control unit is released, and the control unit enters the operating state. Further, power is supplied to the image forming unit. The flag is referred to in subsequent S54, and in a case where the flag is 1, power is additionally supplied to the UI unit in S56. At that time, in a case where any one of the two paper sensors detects paper, the light emitter is turned on, and the paper remaining is notified of.

On the other hand, in a case where it is determined in S42 that the return operation has been performed, and in a case where the detection of a person is determined in S44, S48 is executed. In S48, power is supplied to the specified power supply destination. Specifically, the sleep state of the control unit is released, and power is supplied to the UI unit. In a case where the return events occur, the specified power supply destination does not include the image forming unit.

The flag is referred to in subsequent S50, and in a case where the flag is 1, power is additionally supplied to the image forming unit in S52. At that time, in a case where any one of the two paper sensors detects paper, the light emitter is turned on, and the paper remaining is notified of.

Even in a case where another return event occurs, in a case where the image forming unit is not included in the specified power supply destination, the flag is referred to in S50, and in a case where the flag is 1, power is additionally supplied to the image forming unit in S52.

In each of the first operation example and the second operation example described above, in the case of the transition with paper, after determining or identifying whether or not the specified power supply destination includes a specific unit such as an image forming unit, in a case where the specific unit is not included, power is additionally supplied to the specific unit.

Figure 10:
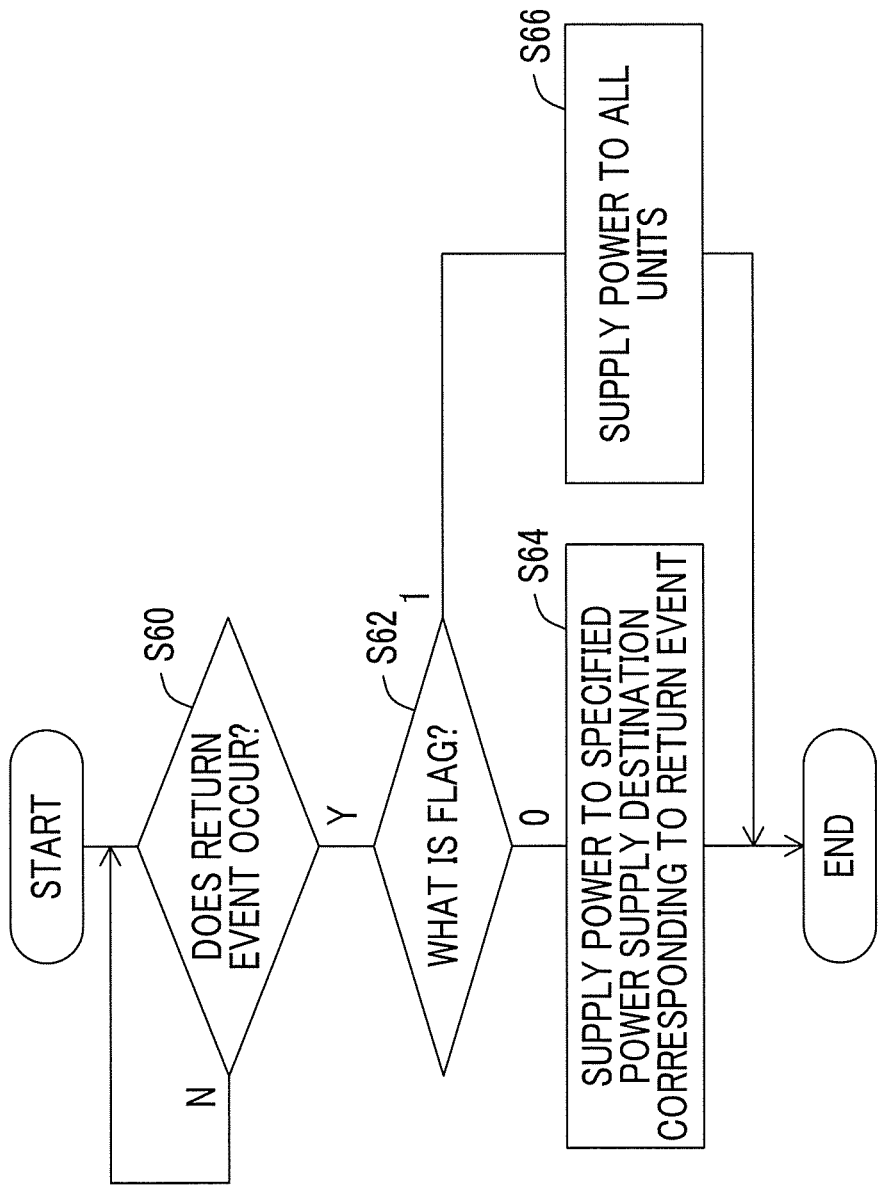
FIG. 10 is a flowchart illustrating a third operation example in the return process.

FIG. 10 illustrates the third operation example in the return process as a flowchart. In a case where it is determined in S60 that a return event has occurred, the flag is referred to in S62. In a case where the flag is 0, in S64, power is supplied to the specified power supply destination corresponding to the return event. On the other hand, in a case where the flag is 1, power is supplied to all units including the specific unit. At that time, in a case where any one of the two paper sensors detects paper, the light emitter is turned on, and the paper remaining is notified of. In a case where the flag is 1, power may be supplied to all units by releasing partial power saving. In this case, the partial power saving may be temporarily released. In that case, the power supply to the specific unit may be stopped after the predetermined time has elapsed.

In the third example, the possibility that power may be supplied to units that do not need to operate may be pointed out. On the other hand, according to the third example, the determination as to whether or not the specified power supply destination corresponding to the return event includes the specific unit can be omitted.

Figure 11:
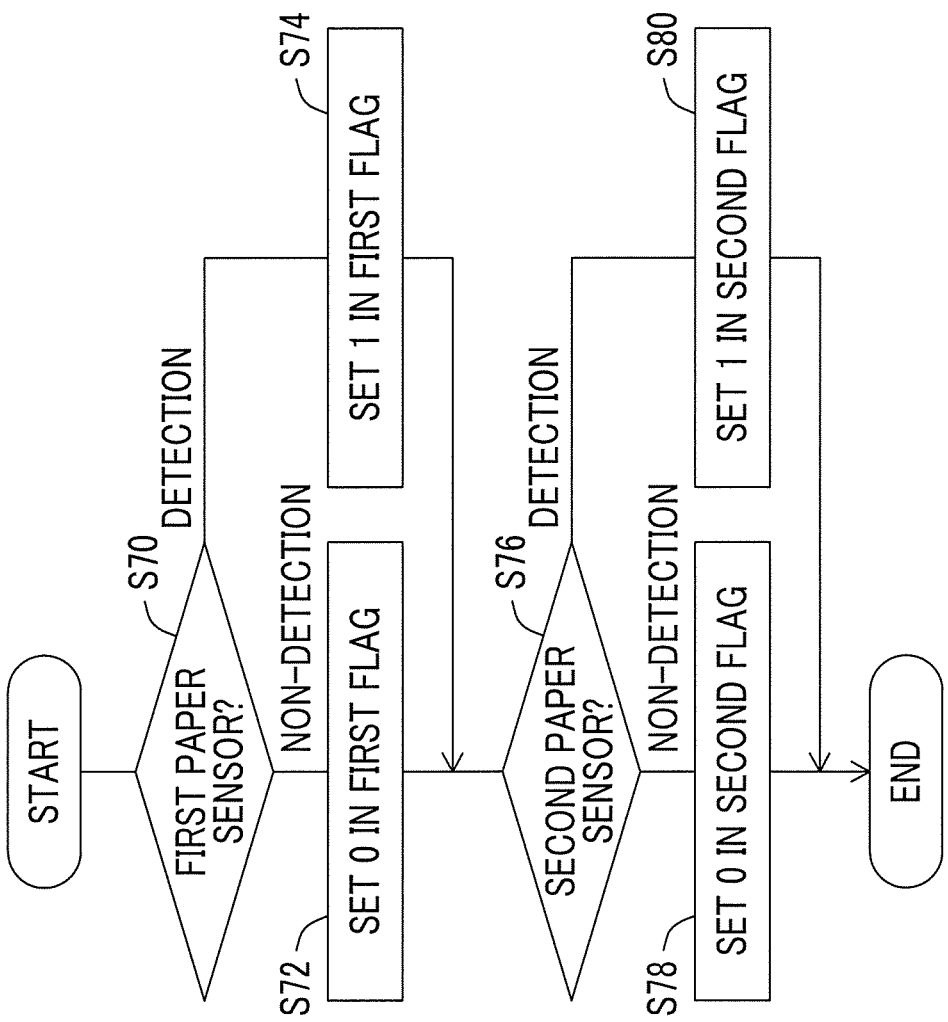
FIG. 11 is a flowchart illustrating an operation in a transition process according to a modification example.
Figure 12:
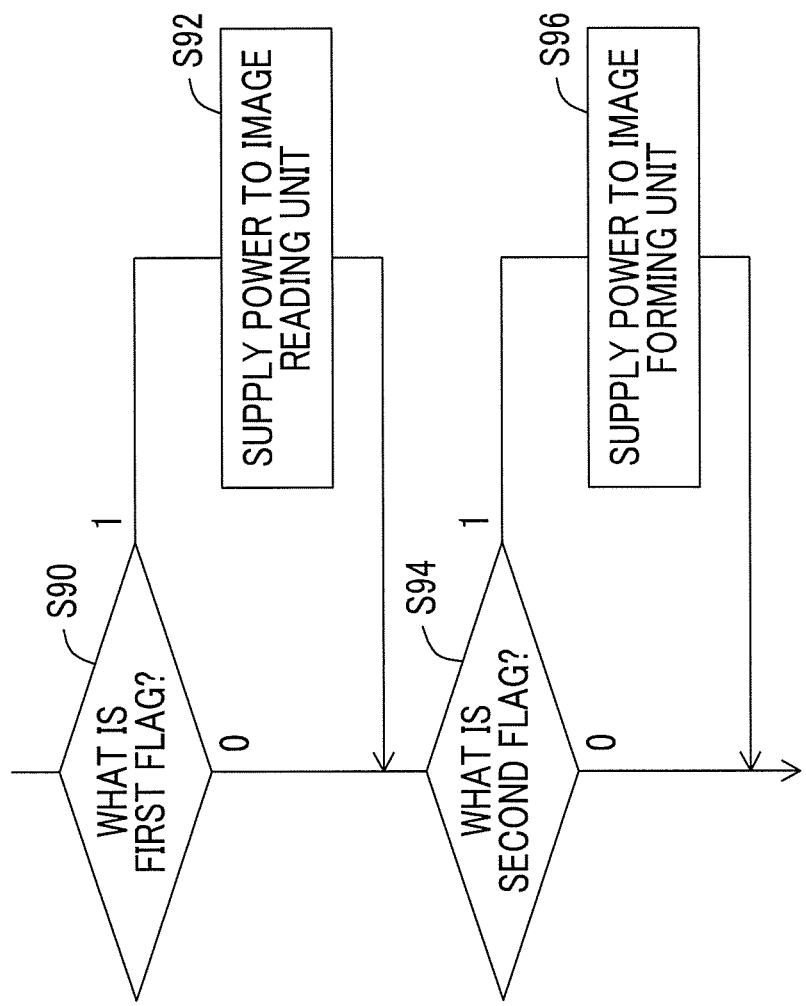
FIG. 12 is a flowchart illustrating an operation in a return process according to a modification example.

FIGS. 11 and 12 illustrate a modification example. In this modification example, the image reading unit has a first discharge tray provided with a first paper sensor, and a first light emitter for notifying the paper remaining on the first discharge tray. Further, the image forming unit has a second discharge tray provided with a second paper sensor, and a second light emitter for notifying the paper remaining on the second discharge tray.

FIG. 11 illustrates the operation in the transition process in the modification example as a flowchart. In S70, it is determined whether or not a paper is detected based on the output signal of the first paper sensor. In a case where no paper is detected, 0 is set in the first flag in S72. In a case where a paper is detected, 1 is set in the first flag in S74. In S76, it is determined whether or not a paper is detected based on the output signal of the second paper sensor. In a case where no paper is detected, 0 is set in the second flag in S78. In a case where a paper is detected, 1 is set in the second flag in S80.

FIG. 12 illustrates a part of the operation in the return process in the modification example as a flowchart. In a case where the specified power supply destination corresponding to the return event does not include the image reading unit and the image forming unit, the value of the first flag is referred to in S90. In a case where the first flag is 1, power is supplied to the image reading unit in S92. Thus, the first paper sensor and the first light emitter become operable, and in a case where the paper remains on the first discharge tray, the first light emitter is turned on.

In S94, the value of the second flag is referred to. In a case where the second flag is 1, power is supplied to the image forming unit in S96. Thus, the second paper sensor and the second light emitter become operable, and in a case where the paper remains on the second discharge tray, the second light emitter is turned on.

As described above, in the first modification example, according to the paper remaining mode at the time of the transition, one or a plurality of units that need to be supplied with power to notify of the paper remaining at the time of return are specified, and power supply to the one or the plurality of units is secured.

FIG. 13 illustrates an example of a screen for selecting an operation mode. As already described, in the image forming apparatus according to the exemplary embodiment, regarding the partial power saving, the operation modes selectively applied at the time of returning from the sleep mode include the power saving priority mode, the paper remaining notification priority mode, and the all unit return mode, and the power supply is controlled in accordance with an operation mode selected from these modes at the time of return.

The power saving priority mode is an operation mode in which power is not supplied to a specific unit and priority is given to power saving at the time of return even in the case of the transition with paper. In a case where the power saving priority mode is selected, the button 122 is selected. The paper remaining notification priority mode is an operation mode in which power is supplied to a specific unit and priority is given to the notification of paper remaining at the time of return in the case of the transition with paper. In a case of selecting the paper remaining notification priority mode, the button 124 is selected. The all unit return mode is an operation mode in which power is supplied to all units at the time of return in the case of the transition with paper. Since power is supplied to the specific unit at the time of return, in a case where a paper remains, the user is notified of the paper remaining. In a state where the all unit return mode is selected, in a case where the transition without paper occurs, the operation at the time of return is the same as the operations in the power saving priority mode and the paper remaining notification priority mode. In a case of selecting the all unit return mode, the button 126 is selected.

In the above-described exemplary embodiment, when returning after the transition with paper, in a case where the specified power supply destination does not include the specific unit and the power is additionally supplied to the specific unit, at a time the paper sensor detects the removal of the paper or a predetermined time has elapsed since the return, the supply of power to the specific unit may be stopped. That is, a state of supplying power only to the specified power supply destination may be established afterwards.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a unit group including a specific unit having a specific component that performs an operation necessary for notification of paper remaining on a mounting surface; and
a processor configured to control supply of power to the unit group at a return from a sleep state based on a return event,
wherein the processor is configured to in a case where there is no paper on the mounting surface at a transition to the sleep state, perform first control to supply power to a specified power supply destination corresponding to the return event at the return from the sleep state, and in a case where there is a paper on the mounting surface at the transition to the sleep state, perform second control to supply power to the specific unit at the return from the sleep state even in a case where the specific unit is not included in the specified power supply destination of the unit group.

2. The image forming apparatus according to claim 1,
wherein the specific unit is an image forming unit that forms an image on paper,
wherein a return event group that causes the return includes a predetermined return event,
wherein a specified power supply destination corresponding to the predetermined return event does not include the image forming unit, and
wherein in a case where there is a paper on the mounting surface at the transition to the sleep state, and the predetermined return event occurs, the second control supplies power to the image forming unit, in addition to the specified power supply destination corresponding to the predetermined return event.

3. The image forming apparatus according to claim 2,
wherein the predetermined return event includes detection of a person by a human sensor.

4. The image forming apparatus according to claim 2,
wherein the predetermined return event includes an operation of releasing the sleep state.

5. The image forming apparatus according to claim 1,
wherein the processor is configured to, in a case where the specified power supply destination does not include the specific unit, determine an actual power supply destination by adding the specific unit to the specified power supply destination, in the second control.

6. The image forming apparatus according to claim 1,
wherein the second control supplies power to the entire unit group regardless of contents of the return event.

7. The image forming apparatus according to claim 1,
wherein the specific component is a paper sensor that detects paper on the mounting surface.

8. The image forming apparatus according to claim 7,
wherein the specific unit is an image forming unit that forms an image on paper, and
wherein the mounting surface is a discharge tray on which an image-formed paper on which an image is formed by the image forming unit is placed.

9. The image forming apparatus according to claim 8, further comprising:
a light emitter that notifies of the paper remaining,
wherein the processor is configured to, in a case where the paper sensor detects the image-formed paper after the return from the sleep state, cause the light emitter to emit light.

10. The image forming apparatus according to claim 8,
wherein a return event group that causes the return includes a first return event and a second return event,
wherein a specified power supply destination corresponding to the first return event includes the image forming unit,
wherein a specified power supply destination corresponding to the second return event does not include the image forming unit,
wherein in a case where the first return event has occurred, the first control supplies power to the specified power supply destination corresponding to the first return event, and
wherein in a case where the second return event has occurred, the second control supplies power to the image forming unit and the specified power supply destination corresponding to the second return event.

11. The image forming apparatus according to claim 1,
wherein the specific component includes a plurality of specific components, and
wherein the second control supplies power to a plurality of specific units including the plurality of specific components, regardless of a configuration of the specified power supply destination.

12. The image forming apparatus according to claim 11,
wherein the plurality of specific components are a paper sensor provided on the mounting surface, and a light emitter that notifies of the paper remaining, and
wherein the plurality of specific units are a first specific unit including the paper sensor and a second specific unit including the light emitter.

13. The image forming apparatus according to claim 11,
wherein the plurality of specific components are a plurality of paper sensors provided on a plurality of the mounting surfaces, and
wherein the plurality of specific units are a plurality of units including the plurality of paper sensors.

14. An image forming apparatus comprising:
a unit group including a specific unit having a specific component that performs an operation necessary for notification of paper remaining on a mounting surface; and
a processor configured to control supply of power to the unit group at a return from a sleep state,
wherein the processor is configured to in a case where there is no paper on the mounting surface at a transition to the sleep state and a return event occurs in the sleep state, and in a case where there is a paper on the mounting surface at the transition and a specified power supply destination corresponding to a return event occurring in the sleep state includes the specific unit, supply power to the specified power supply destination, and in a case where there is a paper on the mounting surface at the transition, and in a case where the specific unit is not included in a specified power supply destination corresponding to a return event occurring in the sleep state, supply power to the specific unit, in addition to the specified power supply destination.

15. A non-transitory computer readable medium storing a program for power supply control executed in an image forming apparatus,
wherein the image forming apparatus includes a unit group including a specific unit having a specific component that performs an operation necessary for notification of paper remaining on a mounting surface,
the program comprising:
a function of, in a case where there is no paper on the mounting surface at a transition to the sleep state, performing a first control to supply power to a specified power supply destination corresponding to the return event at the return from the sleep state, and
a function of, in a case where there is a paper on the mounting surface at the transition to the sleep state, performing second control to supply power to the specific unit at the return from the sleep state even in a case where the specific unit is not included in the specified power supply destination of the unit group.

* * * * *